United States Patent [19]
Weiler et al.

[11] Patent Number: 5,067,595
[45] Date of Patent: Nov. 26, 1991

[54] SPOT-TYPE DISC BRAKE

[75] Inventors: Rolf Weiler, Frankfurt am Main; Uwe Bach, Niedernhausen; Ahmet D. Ceylan, Frankfurt am Main, all of Fed. Rep. of Germany

[73] Assignee: Alfred Teves GmbH, Frankfurt am Main, Fed. Rep. of Germany

[21] Appl. No.: 184,220

[22] Filed: Apr. 21, 1988

[30] Foreign Application Priority Data

Apr. 25, 1987 [DE] Fed. Rep. of Germany ....... 3713948

[51] Int. Cl.⁵ .............................................. F16D 65/02
[52] U.S. Cl. ................................................. 188/73.45
[58] Field of Search ........................... 188/73.44, 73.45

[56] References Cited

U.S. PATENT DOCUMENTS

| | | | |
|---|---|---|---|
| 4,279,331 | 7/1981 | Lüpertz | 188/73.45 |
| 4,313,526 | 2/1982 | Farr | 188/73.45 |
| 4,355,707 | 10/1982 | Saito | 188/73.45 |
| 4,392,559 | 7/1983 | Oshima | 188/73.45 |
| 4,401,194 | 8/1983 | Klassen | 188/73.45 |
| 4,650,039 | 3/1987 | Weiler et al. | 188/73.44 |

FOREIGN PATENT DOCUMENTS

| | | |
|---|---|---|
| 0018913 | 11/1980 | European Pat. Off. . |
| 0097418 | 1/1984 | European Pat. Off. . |
| 1935863 | 1/1971 | Fed. Rep. of Germany . |
| 2160056 | 2/1974 | Fed. Rep. of Germany . |
| 2351447 | 5/1974 | Fed. Rep. of Germany . |
| 2544370 | 4/1977 | Fed. Rep. of Germany . |
| 2061673 | 6/1978 | Fed. Rep. of Germany . |
| 2849952 | 8/1983 | Fed. Rep. of Germany . |
| 3614786 | 11/1986 | Fed. Rep. of Germany . |
| 2284800 | 4/1976 | France . |

Primary Examiner—Matthew C. Graham
Attorney, Agent, or Firm—Robert P. Seitter; J. Gordon Lewis

[57] ABSTRACT

The present invention relates to a spot-type disc brake comprising a brake housing in which two brake pads are held and guided by way of pins. According to this invention, the pins are arranged in the fringe area of the pads such that they bear against side walls of an aperture receiving the brake pads.

8 Claims, 2 Drawing Sheets

SPOT-TYPE DISC BRAKE

BACKGROUND OF THE INVENTION

The present invention relates to a spot-type disc brake having a brake housing in which two brake pads are held and guided by means of pins.

A similar spot-type disc brake is shown on page 197 of the Brake Handbook, 9th edition, Bartsch Publishing House, Ottobrunn near Munich. The pad carriers include holes through which the pins extend. In the situation where the brakes have not been applied for a long period of time, there will be corrosion developed between the pad carriers and the caliper. In order to prevent such corrosion, rustproof materials have bee provided in the aperture of the brake caliper at these locations between pad carriers and brake caliper.

A spot-type disc brake having a brake caliper straddling the brake disc is disclosed in the German published patent application P 28 49 952 at page 6, second paragraph. On either side of that brake disc inside the brake caliper there are arranged two brake shoes which are each composed of one pad plate and one metal back plate. The brake caliper and the back plate of the brake shoes are slidably guided and supported independently of one another at pins which are secured in parallel to the axis of rotation of the brake disc at the arms of the brake carrier. The pins also serve as guide bolts for the brake caliper.

SUMMARY OF THE INVENTION

It is an object of the present invention to devise a simple spot-type disc brake which does not permit corrosion to occur between the pad carriers and the brake caliper.

This object is achieved according to the invention wherein the brake pads are supported on pins arranged in the fringe area of the pads which are supported on side walls of an aperture in the caliper.

According to a method of manufacturing, one pin bore is drilled relative to an aperture in the brake housing wherein the brake pads are received and the second pin bore is drilled relative to the first pin bore.

BRIEF DESCRIPTION OF THE DRAWING

The invention be better understood after reading the following Detailed Description of the Preferred Embodiment in conjunction with the accompanying drawings of which.

DETAILED DESCRIPTION OF A PREFERRED EMBODIMENT

Figure 1:
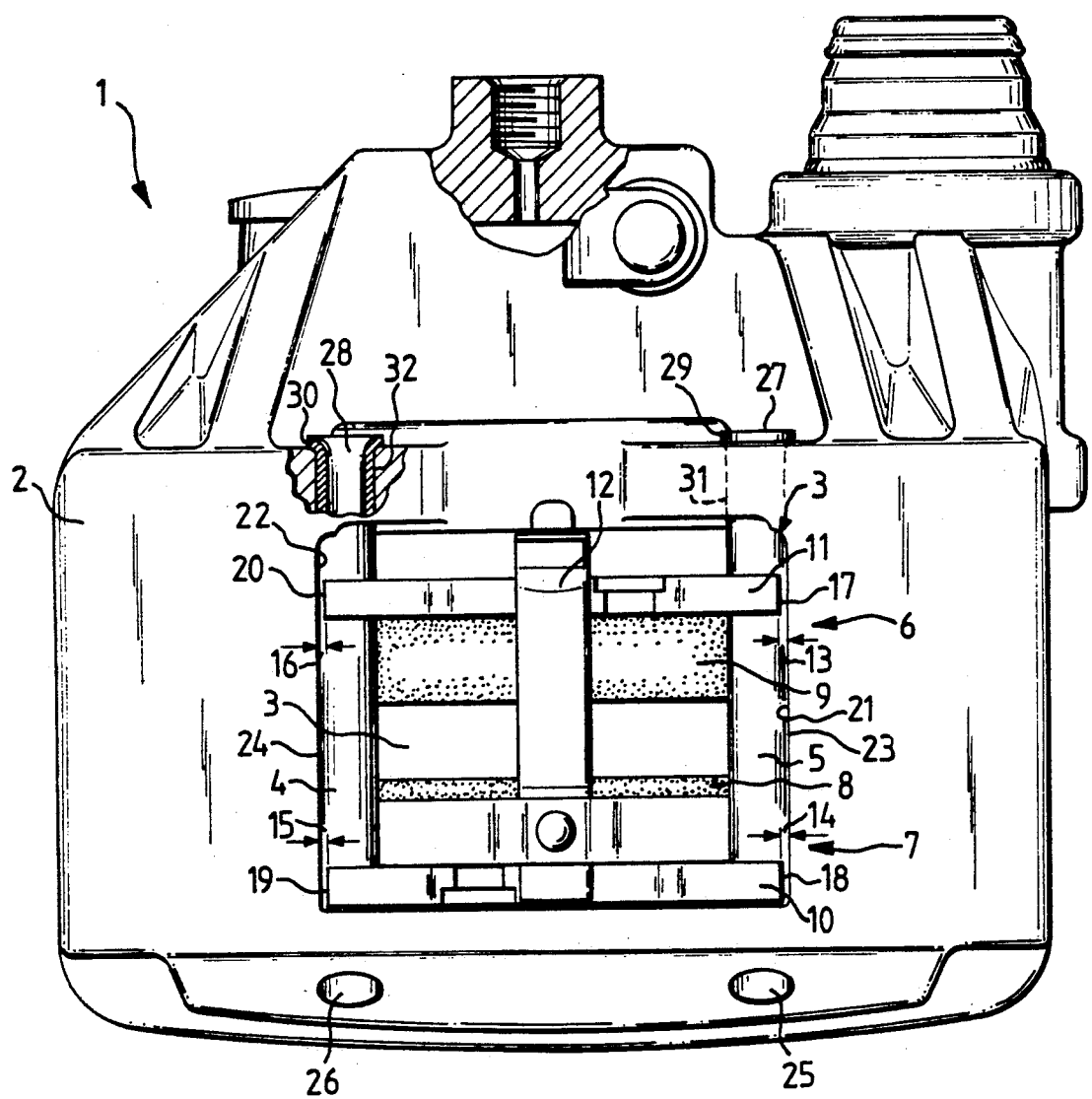
FIG. 1 is a top view of a spot-type disc brake according to the invention.

FIG. 1 is a top view of a spot-type disc brake 1 including a brake-caliper housing 2 having an aperture 3. Incorporated in the aperture 3 are pins 4, 5 which serve to retain and guide two brake pads 6, 7. Each one of the brake pads 6, 7 comprises a friction lining 8, 9 as well as a pad-carrier plate 10, 11. A spring 12 prevents rattling of the brake pads 6, 7. The pad carriers 10, 11 of the brake pads 6, 7 are held and guided by the pins 4, 5 in such a fashion that, in the rest condition and upon brake application, there is always a radial clearance 13, 14, 15, 16, hereinbelow referred to as a gap, between the walls 17, 18, 19, 20 of the pad-carrier plates 10, 11 and the aperture walls 21, 22. The cylindrical surfaces 23, 24 of the pins 4, 5 abut on the aperture side walls 21, 22 and take support thereon, respectively. The pins 4, 5 may be solid pins, i.e., from solid material, or may be hollow and include a slot. The pins function as dowel pins and are held in frictional engagement in the openings 25 and 26 of the brake caliper 2 by being jammed therein. At their ends 27, 28, the pins 4, 5 include beaded portions 29, 30 in order to prevent them from slipping off in the direction of the openings 25, 26. The pins 4, 5 with their headed ends 27, 28 extend through bores 31, 32.

Figure 2:
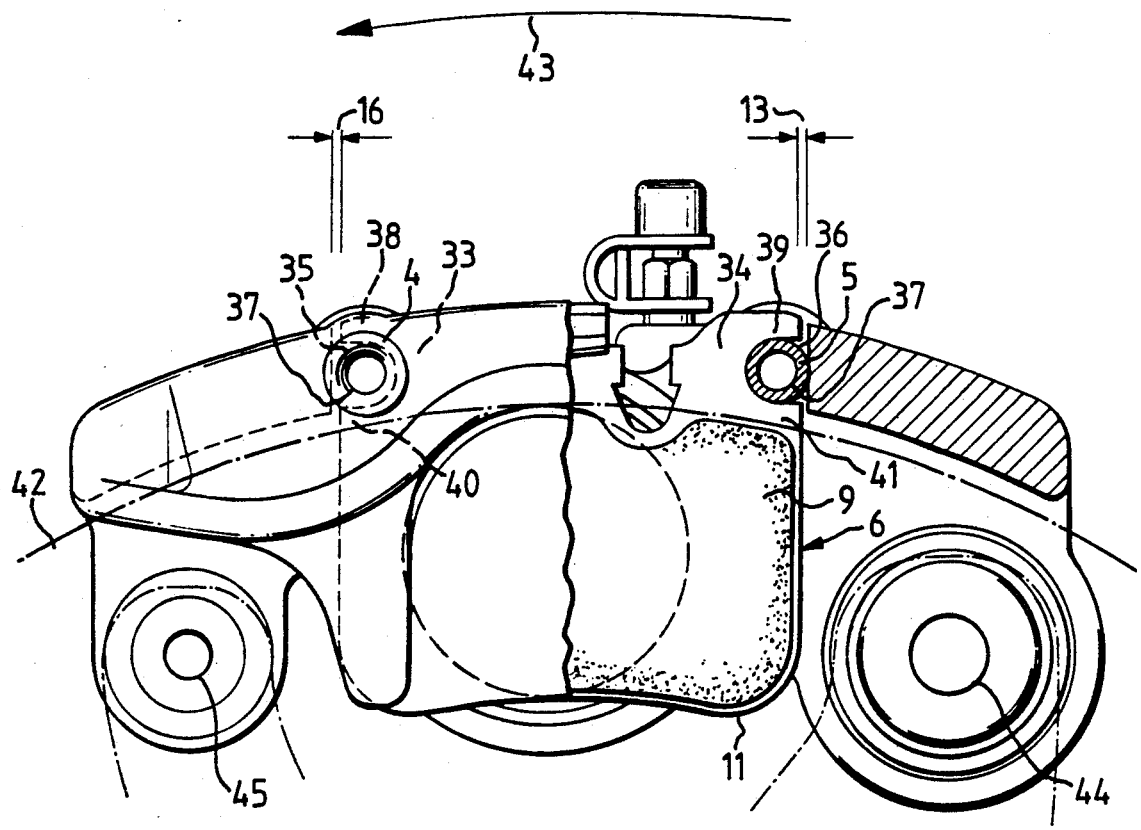
FIG. 2 is a side view in partial cross section of a spot-type disc brake according to the invention.

FIG. 2 is a side view of the spot-type disc brake in partial cross section. The carrier 11 of the brake pad 6 comprises in the holding areas 33, 34, hereinbelow referred to as the fringe areas, recesses 35, 36 which are open laterally and into which the pins 4, 5 are engaged. In an advantageous manner, any corrosion produced will drop out of the semicircular recesses 35, 36. Pins 4, 5 are hollow and, as noted, include a slot 37 so that the pins may function as dowel pins and be held in frictional engagement in the openings 25 and 26 of the brake caliper 2 by being jammed therein. The diameter of the pins 4, 5 and the recesses 35 and 36 of the pad carrier 11 are dimensioned such that the pins 4, 5 sink into the recesses 35, 36 substantially more than halfway. Arms 38, 39 and portions 40, 41 of the pad carrier 11 form with the aperture walls 21, 22 the defined gaps 13 and 16. Consequently, the aperture walls 21, 22 cannot come into contact with the pad carrier 11 and no rust bridges will be created. The description in respect of the pad carrier 11 is substantially the same as for the pad carrier 10 which is arranged as a mirror image relative to a brake disc 42. In an advantageous manner, this prevents corrosion between the pad carriers 10, 11 and the brake caliper 2 and economizes a partition plate which is made of NIROSTA steel (NIROSTA is a registered tradename for stainless steel) or a superrefined steel plate. In operation, during forward driving, the brake disc 42 rotates in the direction of rotation 43. The brake caliper 2 is flanged directly to the steering knuckle of the vehicle by way of sleeves 44, 45 and (non-illustrated) bolts. The brake caliper 2 is supported by a main bearing 44 composed of bolts and carrier sleeve 44. The bearing receives a circumferential force and provides for guidance. A movable bearing 45 composed of bolts and sleeve 45 also provides for guidance. The brake caliper 2 supports both pads 6, 7 by way of the pins 4, 5 because of the transmission of circumferential forces. During manufacture, the bore 26, 32 for the pin, which lies opposite to the main bearing 44, is drilled in relationship to the aperture wall 22 in order to arrange the pin 4 with minimum tolerances to the aperture wall 22, since it is there where the greatest radial brake forces occur during a braking action when driving forwards (in the driving direction). Thee bore 25, 31 is drilled by the same tool in relationship to the bore 26, 32 because brake forces will occur there during a braking action only when driving rearwards.

Figure 3:
FIG. 3 is a beta-shaped pin retaining spring.

FIG. 3 shows a beta-shaped spring 46 for retaining the pins.

Figure 4:
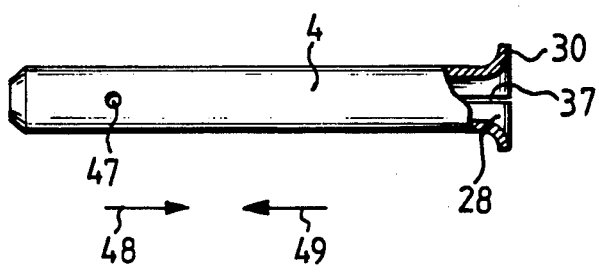
FIG. 4 is a pin with a portion cutaway showing details of construction.

FIG. 4 shows one of the pins 4, 5 having an opening 47 through which the beta-shaped spring 46 extends. Instead of the dowel pins 4, 5 being clamped in the openings 25, 26, the beta-shaped spring 46 may extend through the opening 47 in order to prevent the pins 4, 5 from slipping off in the direction 48. To fix the pins 4, 5 and to prevent them from slipping off in the direction 49, the pin end 28 of the pin 4 is furnished with a beaded portion 27. Preferably, the pins are rolled steel plates of NIROSTA or stainless steel.

What is claimed is:

1. A spot-type disc brake comprising, in combination: a brake caliper housing, two brake pad carriers held and guided in said housing by means of pins, wherein the pins are arranged in a fringe area of the pad carriers and are supported on and abut against side walls of an aperture in the brake caliper housing wherein said brake pad carriers are received, and wherein a predetermined gap is maintained. between the respective ends of said brake pad carriers and the adjacent side wall apertures thereby to prevent corrosion therebetween.

2. The spot-type disc brake as claimed in claim 1 wherein the brake pad carriers include recesses which are open laterally and into which the pins are engaged.

3. The spot-type disc brake as claimed in claim 1 wherein the pins are hollow.

4. The spot-type disc brake as claimed in claim 1 wherein the pins have beaded portions at their ends.

5. The spot-type disc brake as claimed in claim 1 wherein the pins contain openings for accommodating beta-shaped springs.

6. The spot-type disc brake as claimed in claim 1 wherein the pins are slotted.

7. The spot-type disc brake as claimed in claim 1 wherein the pins are solid pins.

8. A method of manufacturing a brake caliper housing of a spot-type disc brake in which two brake pad carriers are held and guided by means of pins, said method comprising the steps of: drilling a first pin bore through, and opposite to a main mounting bearing of, said housing in relationship to and immediately adjacent to an aperture wall of said brake caliper housing wherein said pad carriers are received and drilling a second pin bore in relationship to the first pin bore.

* * * * *